(12) United States Patent
Agnus et al.

(10) Patent No.: US 11,415,071 B2
(45) Date of Patent: Aug. 16, 2022

(54) METHOD FOR MONITORING A PRESSURE SENSOR IN A DIRECT INJECTION SYSTEM

(71) Applicants: Continental Automotive France, Toulouse (FR); Continental Automotive GmbH, Hannover (DE)

(72) Inventors: Yves Agnus, Toulouse (FR); Nicolas Girard, Toulouse (FR); Tet Kong Brian Chia, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/046,588

(22) PCT Filed: Apr. 9, 2019

(86) PCT No.: PCT/FR2019/050836
§ 371 (c)(1),
(2) Date: Oct. 9, 2020

(87) PCT Pub. No.: WO2019/197776
PCT Pub. Date: Oct. 17, 2019

(65) Prior Publication Data
US 2021/0140384 A1 May 13, 2021

(30) Foreign Application Priority Data
Apr. 10, 2018 (FR) ...................................... 1853106

(51) Int. Cl.
*F02D 41/22* (2006.01)
*F02D 1/02* (2006.01)
(Continued)

(52) U.S. Cl.
CPC ............. *F02D 41/222* (2013.01); *F02D 1/02* (2013.01); *F02M 55/025* (2013.01);
(Continued)

(58) Field of Classification Search
CPC .... F02D 41/222; F02D 1/02; F02D 2041/223; F02D 2041/224; F02D 2200/0602;
(Continued)

(56) References Cited

U.S. PATENT DOCUMENTS 6,966,300 B2    11/2005   Fukuda
7,552,716 B2    6/2009    Osaki
(Continued)

FOREIGN PATENT DOCUMENTS

CN    1614216 A    5/2005
CN    1920282 A    2/2007
(Continued)

OTHER PUBLICATIONS

International Search Report and Written Opinion for International Application No. PCT/FR2019/050836, dated Nov. 7, 2019, 8 pages.
(Continued)

*Primary Examiner* — Mahmoud Gimie
(74) *Attorney, Agent, or Firm* — RatnerPrestia

(57) ABSTRACT

A method for monitoring a pressure sensor in a direct injection system including at least one common rail, a high-pressure fuel pump, a hydraulic circuit connecting the high-pressure pump to the common rail, a passive pressure-limiting valve connected to the hydraulic circuit, configured to open once the pressure in the hydraulic circuit is greater than a threshold pressure, so as to discharge the fuel, including the steps of detecting the opening of the pressure-limiting valve, measuring the pressure $P_{MES}$ corresponding to the time of opening of the pressure-limiting valve and comparing the measured pressure $P_{MES}$ to the threshold pressure $P_1$ in order to detect a drift in the pressure sensor.

8 Claims, 2 Drawing Sheets

(51) Int. Cl.
    *F02M 55/02*     (2006.01)
    *F02M 59/02*     (2006.01)
    *F02M 59/20*     (2006.01)
    *G01L 27/00*     (2006.01)

(52) U.S. Cl.
    CPC .......... *F02M 59/025* (2013.01); *F02M 59/20* (2013.01); *G01L 27/007* (2013.01); *F02D 2041/223* (2013.01); *F02D 2041/224* (2013.01); *F02D 2200/0602* (2013.01); *F02M 2200/247* (2013.01)

(58) Field of Classification Search
    CPC ........... F02D 2200/247; F02M 55/025; F02M 59/025; F02M 59/20; G01L 27/007
    USPC .......................................................... 73/1.63
    See application file for complete search history.

(56) References Cited

U.S. PATENT DOCUMENTS

| | | | |
|---|---|---|---|
| 8,511,275 | B2 | 8/2013 | Nistler et al. |
| 9,599,086 | B2 * | 3/2017 | Smith ................ F02D 41/3845 |
| 2003/0046990 | A1 | 3/2003 | Joos et al. |
| 2008/0210200 | A1 | 9/2008 | Cwielong et al. |
| 2011/0022290 | A1 * | 1/2011 | Kaneko ............... F02D 41/2464 |
| | | | 701/103 |
| 2012/0037119 | A1 | 2/2012 | Adler |
| 2012/0080010 | A1 * | 4/2012 | Nistler ................ F02D 41/3863 |
| | | | 123/456 |
| 2015/0153242 | A1 * | 6/2015 | Jenne .................. F02D 41/3863 |
| | | | 73/1.69 |
| 2016/0153366 | A1 | 6/2016 | Steinert |
| 2018/0148038 | A1 * | 5/2018 | Ulrey .................... B60W 20/15 |

FOREIGN PATENT DOCUMENTS

| | | |
|---|---|---|
| CN | 103119272 A | 5/2013 |
| DE | 102014220422 A1 | 4/2016 |
| EP | 2518303 A1 | 10/2012 |
| FR | 2744765 A1 | 8/1997 |
| FR | 2914699 A1 | 10/2008 |
| GB | 2495140 A | 4/2013 |
| JP | 2010169022 A * | 8/2010 |
| JP | 2014043820 A * | 3/2014 |

OTHER PUBLICATIONS

International Search Report and Written Opinion for International Application No. PCT/FR2019/050836, dated Nov. 7, 2019, 13 pages (French).

Chinese Office Action for Chinese Application No. 201980024575.8, dated Mar. 8, 2022 with translation, 17 pages.

\* cited by examiner

METHOD FOR MONITORING A PRESSURE SENSOR IN A DIRECT INJECTION SYSTEM

CROSS REFERENCE TO RELATED APPLICATIONS

This application is the U.S. National Phase Application of PCT International Application No. PCT/FR2019/050836, filed Apr. 9, 2019, which claims priority to French Patent Application No. 1853106, filed Apr. 10, 2018, the contents of such applications being incorporated by reference herein.

FIELD OF THE INVENTION

The invention is in the field of common rail direct injection systems, and more particularly relates to a method for monitoring a pressure sensor in such a system.

BACKGROUND OF THE INVENTION

In a vehicle comprising a common rail direct injection system, the pressure inside the rail is measured by a pressure sensor and is transmitted to the control unit of the vehicle.

A measurement taken by a pressure sensor can drift over time. The measurement error, caused by the drift, can depend on an offset and/or on a variation in the sensitivity of the sensor.

Controlling the combustion and the decontamination of an engine requires precise measurements of the pressure in the common rail. Such control is not compatible with measurement offsets and high variations in the sensitivity of the pressure sensor.

To this end, it is known for the pressure sensor of a common rail to be controlled or for a drift in this sensor to be diagnosed by measuring the atmospheric pressure imposed in the injection system by an active discharge valve. The active discharge valve can be a PCV (Pressure Control Valve) type valve or a PDV (Pressure Decay Valve) type valve. This calibration method is not compatible with a driving situation of the vehicle.

Furthermore, injection systems without static leakage, also called sealed injection systems, such as some injection systems in diesel engines, do not comprise means for draining the injection system and imposing an atmospheric pressure in the common rail, such as PCV and/or PDV type active valves. Therefore, it is not possible to implement these methods in a diesel engine.

SUMMARY OF THE INVENTION

One aspect of the invention is a method for monitoring a pressure sensor and for detecting a drift when measuring a signal from the pressure sensor in a common rail. Another aspect of the invention is a method for detecting this drift in a driving situation of a vehicle and for correcting the measurement error caused by this drift.

These aims are achieved within the scope of aspects of the present invention by virtue of a method for monitoring a pressure sensor in a direct injection system comprising at least one common rail, a pressure sensor configured to measure a pressure $P_{MES}$ in the common rail, a high-pressure fuel pump comprising a high-pressure piston and a flow control valve 10 having electrical control, a hydraulic circuit connecting the high-pressure pump to the common rail, a control unit configured to control a flow control valve 10 so that the pressure $P_{MES}$ in the common rail is equal to a setpoint pressure, a passive pressure-limiting valve connected to the hydraulic circuit, configured to open once the pressure in the hydraulic circuit is greater than a threshold pressure, so as to discharge the fuel, the method comprising the following steps implemented in the control unit:

detecting the opening of the passive pressure-limiting valve;

measuring the pressure $P_{MES}$ corresponding to the time of opening of the pressure-limiting valve;

comparing the measured pressure $P_{MES}$ to the threshold pressure P1 in order to detect a drift in said pressure sensor.

Advantageously, an aspect of the invention is supplemented by the following features, taken individually or according to any one of their technically possible combinations:

the time of opening of the pressure-limiting valve in step a) is determined by measuring a variation in the value of the electrical control that is greater than $0.1\% \cdot s^{-1}$;

the time of opening of the pressure-limiting valve in step a) is determined by measuring an increase in the value of the electrical control that is greater than 1% in 5 seconds;

the control unit comprises a corrector of the proportional-integrator-shifter type, and the time of opening of the pressure-limiting valve in step a) is determined by measuring a variation of an integrator control of the corrector corresponding to a flow variation that is greater than 100 $ml \cdot min^{-1}$.

Another aspect of the invention is a direct injection system, comprising at least one common rail, a pressure sensor configured to measure the pressure $P_{MES}$ in the common rail, a high-pressure fuel pump comprising a high-pressure piston and a flow control valve 10 having electrical control, a hydraulic circuit connecting the high-pressure pump to the common rail, a control unit configured to control the flow control valve 10 so that the pressure $P_{MES}$ in the common rail is equal to a setpoint pressure, a passive pressure-limiting valve connected to the hydraulic circuit, configured to open once the pressure in the hydraulic circuit is greater than a threshold pressure $P_1$, so as to discharge the fuel, the method comprising the following steps implemented in the control unit, characterized in that the control unit is configured to detect the opening of the pressure-limiting valve, to measure the corresponding pressure $P_{MES}$ at the time of opening the pressure-limiting valve and to compare the measured pressure $P_{MES}$ to the threshold pressure $P_1$, in order to detect a drift in said pressure sensor.

Advantageously, the threshold pressure $P_1$ is strictly greater than 2,000 bar.

BRIEF DESCRIPTION OF THE DRAWINGS

Further features and advantages will become apparent from the following description, which is purely illustrative and non-limiting, and which must be read with reference to the appended figures, in which.

DETAILED DESCRIPTION OF THE PREFERRED EMBODIMENTS

Figure 1:
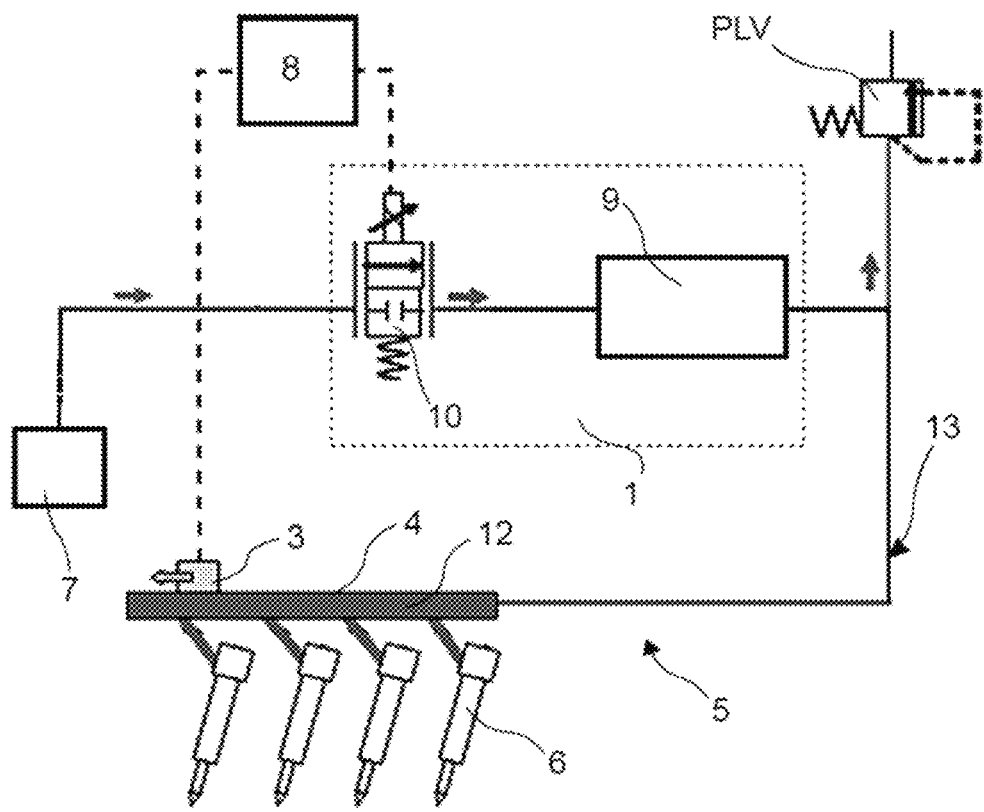
FIG. 1 schematically illustrates a common rail direct injection system.

FIG. 1 schematically illustrates a common rail 4 (or high-pressure rail) direct injection system 5. A common rail 4 is configured to feed fuel injectors 6. A high-pressure pump 1 is used to impose a downstream flow for pressures, for example, that are greater than 300 bar, preferably at 2,000 bar. The high-pressure pump 1 comprises a flow control valve 10 (i.e. for controlling the flow) comprising electrical control. The high-pressure pump 1 also comprises a high-pressure piston 9. The high-pressure pump 1 is connected upstream to a tank 7, so as to allow the fuel to be conveyed directly or indirectly.

The common rail 4 and the high-pressure pump 1 are connected by a hydraulic circuit 13 (or high-pressure pipe). The hydraulic circuit 13 allows the fuel to be conveyed from the pump 1 to the common rail 4.

The hydraulic circuit 13 is also connected to a passive pressure-limiting valve PLV. This valve is configured to open once the effective pressure (without measurement error) in the hydraulic circuit 13 is greater than a threshold pressure $P_1$. In this case, the pressure can be the pressure of a fuel 12 in the hydraulic channel 13. The valve is thus configured to discharge the fuel, i.e. excess fuel, or more generally a fluid, out of the hydraulic circuit 13.

The pressure in the common rail is measured by a pressure sensor 3, completely or partly arranged in the common rail 4. The sensor 3 allows the pressure $P_{MES}$ in the common rail to be measured. This value can be exact, i.e. can exactly represent the effective pressure of a fluid in the common rail, and/or include an error, caused by the drift of the sensor.

A control unit ECU is electrically connected to the pressure sensor 3 and to the high-pressure pump 1 by the electrical control of the flow control valve 10. The control unit ECU comprises at least one processor and one memory. The control unit ECU is configured to automatically control the pressure in the common rail: advantageously it can comprise a corrector of the proportional-integrator-shifter type. The signal from the pressure sensor 3 is an input of the automatic control performed by the control unit ECU. The control unit ECU is configured to control the flow control valve 10 of the high-pressure pump 1 so that the pressure $P_{MES}$ in the common rail equals a setpoint pressure Pc. If the corrector is a PID, the control unit can be configured to individually analyze the various controls of the corrector. Advantageously, the integrator control for the corrector can be analyzed.

Figure 2:
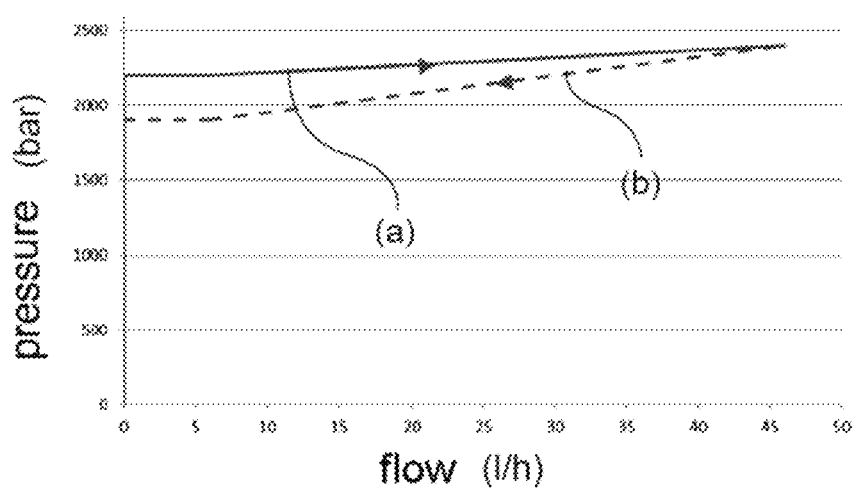
FIG. 2 illustrates the features of a passive pressure-limiting valve.

FIG. 2 shows a feature of the pressure-limiting valve PLV, illustrating the opening pressure of the pressure-limiting valve PLV as a function of the flow. The curve (a) of FIG. 2 illustrates the maximum pressure in the hydraulic circuit 13 and/or in the common rail 4, as a function of the flow imposed by the high-pressure pump, when the pressure-limiting valve PLV is opened. The curve (b) of FIG. 2 illustrates the pressure in the hydraulic circuit 13 and/or in the common rail 4, as a function of the flow imposed by the high-pressure pump, when the pressure-limiting valve PLV is closed.

The pressure-limiting valve PLV characterized in FIG. 2 opens at an effective threshold pressure $P_1$ corresponding to the maximum of the curve (a) at a zero flow rate. In this case, the effective threshold pressure $P_1$ is substantially equal to 2,380 bar. In general, the threshold pressure $P_1$ advantageously is strictly greater than 2,100 bar, which corresponds to the maximum pressure in the common rail 4 during normal operation.

Figure 3:
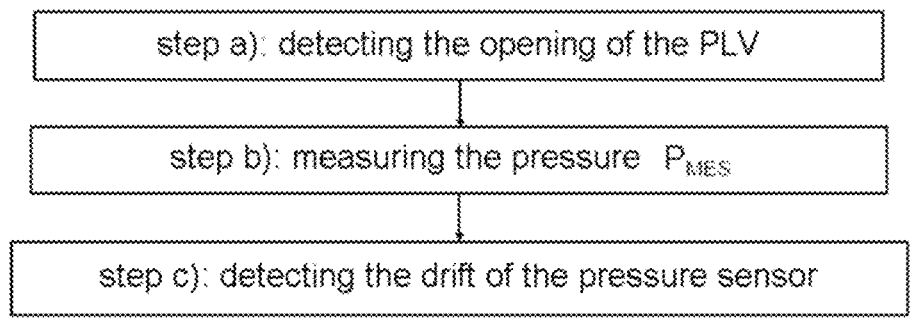
FIG. 3 schematically illustrates a method for determining the drift of a pressure sensor in a direct injection system.

FIG. 3 schematically illustrates a method for determining the drift of a pressure sensor 3 in a direct injection system.

In general, when driving and/or when diagnosing the pressure in the rail of the engine, the signal output from the pressure sensor 3 is measured and the flow control valve 10 of the high-pressure pump 1 is controlled so as to automatically control the pressure in the rail using the control unit 8. The regulator of the control unit 8 can, for example, automatically control the pressure of the rail, with the input of the regulator being the measurement of the pressure sensor $P_{MES}$ and the control for the regulator being the electrical control of the flow control valve 10 of the high-pressure pump. It is possible, for example, during a driving situation, to automatically control the pressure of the rail at a constant pressure, according to a setpoint that is stored by the control unit 8.

In a step a) of the method, the opening of the pressure-limiting valve is detected. The opening of the pressure-limiting valve can be caused by various events, for example, a temporary excess pressure in the pressure rail while driving.

In a step b) of the method, the pressure $P_{MES}$ is measured that corresponds to the time of opening of the pressure-limiting valve PLV in step a) of the method. This measurement can be caused by the detection of the opening of the pressure-limiting valve in step a). It also can be decorrelated from step a): the pressure $P_{MES}$ is continuously measured while automatically controlling the pressure in the common rail.

In a step c) of the method, the measured pressure $P_{MES}$ is compared to the threshold pressure $P_1$ for opening the pressure-limiting valve PLV, in order to detect a possible drift in the pressure sensor 3, and thus to monitor the pressure sensor 3. A drift is detected if the values of $P_{MES}$ and $P_1$ are different. These two values can be compared by the control unit 8. The drift also can be determined, i.e. assessed: it corresponds to a difference between the values of $P_{MES}$ and of $P_1$ at the pressure $P_1$. The drift can correspond to an offset in the measurement, a variation in the sensitivity and/or a variation in the detection threshold.

Following step c) of the method, it is possible to calibrate the pressure sensor 3 if a drift has been detected during step c) of the method. Advantageously, the measured pressure $P_{MES}$ value is set at the time t to the value of the opening pressure $P_1$. Depending on the considered drift model, the calibration can correspond to a shift in the ordinates (in the case of an offset) or, for example, to a variation in the pitch of a linear model.

The opening of the pressure-limiting valve also can be controlled: the control unit 8 can be configured to perform a diagnostic or a test of the drift of the pressure sensor. In this case, the regulator can be configured to impose a progressive increase in the pressure setpoint Pc in the common rail, until the pressure-limiting valve is opened and it is detected in step a) of the method.

Figure 4:
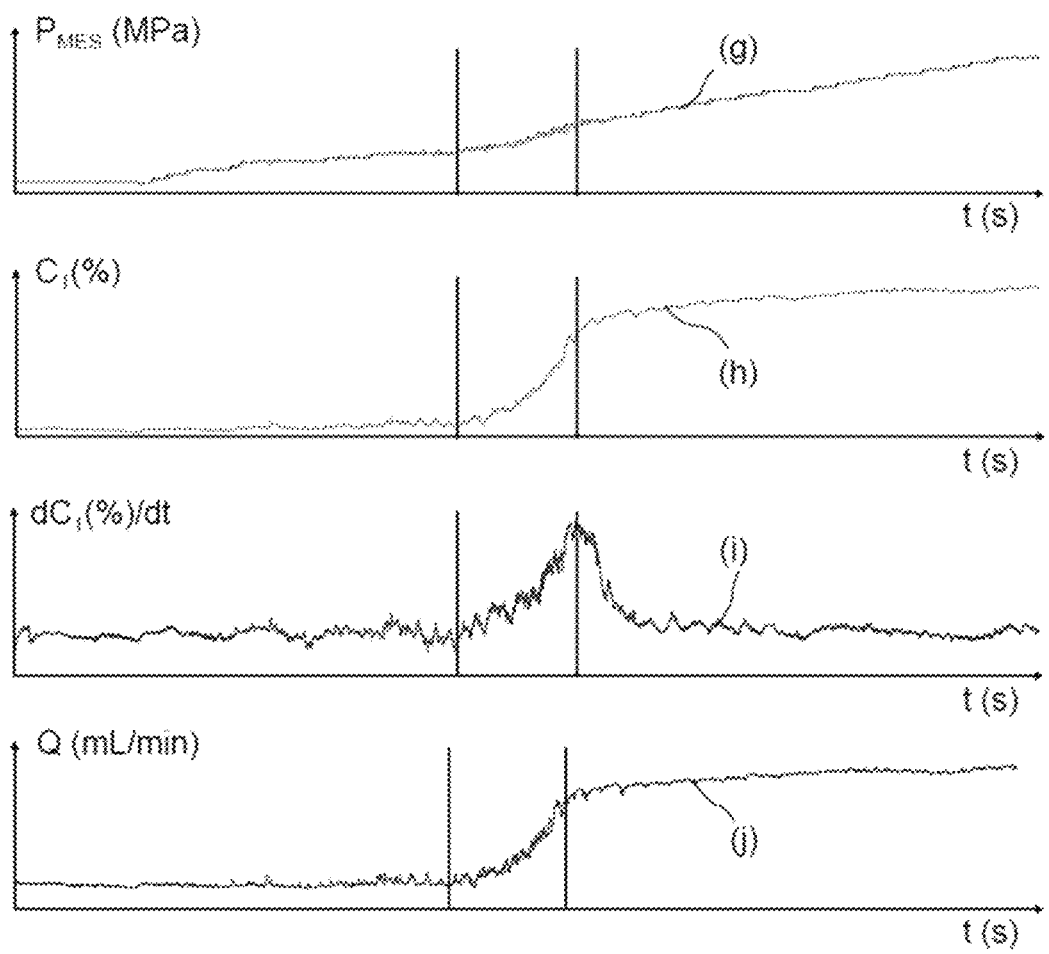
FIG. 4 illustrates the evolution of values of the direct injection system.

FIG. 4 illustrates the evolution of values of the direct injection system. The curve (g) of FIG. 4 illustrates the evolution of the pressure $P_{MES}$ measured by the pressure sensor. The analysis of the evolution of $P_{MES}$ does not allow measurement of the time at which the pressure-limiting valve opens. The minimum and the maximum of the curve (g) of FIG. 4 respectively correspond to 179 MPa and to 210 MPa. The curve (h) of FIG. 4 illustrates the control $C_1$ of the control unit ECU toward the high-pressure pump 1. The minimum value and the maximum value of the curve (h) of FIG. 4 respectively correspond to 20.6% and 23.5%, with this value being equal to the duty cycle of a PWM (Pulse Width Modulation) type signal. A value of 0% corresponds, for example, to the absence of pumping by the high-pressure pump 1 and a value of 100% corresponds, for example, to pumping at the maximum capacity of the high-pressure pump 1. Advantageously, the time of opening of the pressure-limiting valve can be detected and/or measured when the variation of $C_1$ exceeds a threshold value and/or in the event of a pitch discontinuity of $C_1$. Preferably, an increase in the control $C_1$ of more than 1% is measured between a first time and a second time, separated by 5 seconds. These two times are illustrated using black vertical bars in all the diagrams of FIG. 4. The electrical control $C_1$ particularly can be adapted to receive PWM type signals. These signals typically have a frequency of more than 100 Hz, for example, substantially equal to 500 Hz. In this case, the value of the electrical control $C_1$ is equal to the duty cycle of the modulated signal.

The curve (i) of FIG. 4 illustrates the evolution of the drift $dC_1/dt$ of the control $C_1$. The minimum and the maximum of the curve (i) of FIG. 4 respectively correspond to 0.03%/s and 0.20%/s. Advantageously, the opening of the pressure-limiting valve can be detected when a threshold value of $dC_1/dt$ is exceeded or through a spike in $dC_1/dt$. Preferably, this threshold value is greater than 0.1%/s.

The curve (j) of FIG. 4 illustrates the evolution of the integrator control Q of the corrector. The minimum and the maximum of the curve (i) of FIG. 4 respectively correspond to a variation in the control causing a variation in the flow imposed by the high-pressure pump 1 of −54 ml/min and 247 ml/min. Advantageously, the opening of the pressure valve can be detected by measuring a variation in the integrator control corresponding to the imposition of a flow variation of the high-pressure pump 1 that is greater than 100 ml/min. The variation of the signal of the curve (j) corresponds to a leak rate caused by the opening of the pressure-limiting valve PLV.

The invention claimed is:

1. A method for monitoring a pressure sensor in a direct injection system comprising at least one common rail, a pressure sensor configured to measure a pressure $P_{MES}$ in the common rail, a high-pressure fuel pump comprising a high-pressure piston and a flow control valve having electrical control, a hydraulic circuit connecting the high-pressure pump to the common rail, a control unit configured to control the flow control valve so that the pressure $P_{MES}$ in the common rail is equal to a setpoint pressure, a passive pressure-limiting valve connected to the hydraulic circuit, configured to open once the pressure in the hydraulic circuit is greater than a threshold pressure $P_1$, so as to discharge the fuel, the method comprising the following steps implemented in the control unit:

a) detecting the opening of the pressure-limiting valve;
b) measuring the pressure $P_{MES}$ corresponding to a time of opening of the pressure-limiting valve; and
c) comparing the measured pressure $P_{MES}$ to the threshold pressure $P_1$ in order to detect a drift in said pressure sensor.

2. The method as claimed in claim 1, wherein the time of opening of the pressure-limiting valve in step a) is determined by measuring a variation in a value of the electrical control that is greater than $0.1\% \cdot s^{-1}$.

3. The method as claimed in claim 1, wherein the time of opening of the pressure-limiting valve in step a) is determined by measuring an increase in a value of the electrical control that is greater than 1% in 5 seconds.

4. The method as claimed in claim 1, wherein the control unit comprises a proportional-integrator-shifter type corrector, and wherein the time of opening of the pressure-limiting valve in step a) is determined by measuring a variation of an integrator control of the corrector corresponding to a flow variation that is greater than 100 ml·min$^{-1}$.

5. The method as claimed in claim 1, wherein the setpoint pressure is progressively increased before step a).

6. The method as claimed in claim 1, wherein the time of opening of the pressure-limiting valve in step a) is determined by measuring an increase in the value of the electrical control that is greater than 1% in 5 seconds.

7. A direct injection system, comprising at least one common rail, a pressure sensor configured to measure the pressure $P_{MES}$ in the common rail, a high-pressure fuel pump comprising a high-pressure piston and a flow control valve having electrical control, a hydraulic circuit connecting the high-pressure pump to the common rail, a control unit configured to control the flow control valve so that the pressure $P_{MES}$ in the common rail is equal to a setpoint pressure, a passive pressure-limiting valve connected to the hydraulic circuit, configured to open once the pressure in the hydraulic circuit is greater than a threshold pressure $P_1$, so as to discharge the fuel, the method comprising the following steps implemented in the control unit, wherein the control unit is configured to detect the opening of the pressure-limiting valve, to measure the corresponding pressure $P_{MES}$ at the time of opening the pressure-limiting valve and to compare the measured pressure $P_{MES}$ to the threshold pressure $P_1$, in order to detect a drift in said pressure sensor.

8. The system as claimed in claim 7, wherein the threshold pressure $P_1$ is strictly greater than 2,000 bars.

* * * * *